United States Patent
O'Mahony et al.

(10) Patent No.: US 12,360,968 B2
(45) Date of Patent: Jul. 15, 2025

(54) DETECTION AND REMOVAL OF STALE DATA EXCLUSION WINDOWS

(71) Applicant: Dell Products L.P., Round Rock, TX (US)

(72) Inventors: Lisa O'Mahony, Cork (IE); Francisco Jaen, Cork (IE); Jason McCarthy, Cambridge, MA (US)

(73) Assignee: Dell Products L.P., Round Rock, TX (US)

( * ) Notice: Subject to any disclaimer, the term of this patent is extended or adjusted under 35 U.S.C. 154(b) by 9 days.

(21) Appl. No.: 18/356,374

(22) Filed: Jul. 21, 2023

(65) Prior Publication Data

US 2025/0028693 A1 Jan. 23, 2025

(51) Int. Cl.
*G06F 16/215* (2019.01)

(52) U.S. Cl.
CPC .................................. *G06F 16/215* (2019.01)

(58) Field of Classification Search
CPC ............ G06F 16/215; G06F 16/2322; G06F 16/2365; G06F 16/24568; G06F 16/2477; G06F 2201/81; G06F 2201/835; G06F 21/316; G06F 21/552; G06F 11/30; G06F 11/3409; G06F 11/3423; G06F 11/3428; G06F 11/3452

See application file for complete search history.

(56) References Cited

U.S. PATENT DOCUMENTS

| | | | | |
|---|---|---|---|---|
| 7,752,013 | B1 * | 7/2010 | Broyles | G06F 11/3452 702/182 |
| 8,966,039 | B1 * | 2/2015 | Fultz | G06F 11/3055 709/224 |
| 11,366,842 | B1 * | 6/2022 | Swaminathan | G06F 16/2477 |
| 2006/0253426 | A1 * | 11/2006 | Bilotti | G06F 16/972 |
| 2007/0038744 | A1 * | 2/2007 | Cocks | H04L 43/024 709/224 |
| 2014/0317286 | A1 * | 10/2014 | Masuda | G06F 11/3476 709/224 |
| 2020/0065212 | A1 * | 2/2020 | Chanda | G06F 11/3075 |
| 2021/0064250 | A1 * | 3/2021 | Neff | G11B 5/00813 |
| 2021/0073097 | A1 * | 3/2021 | Upadhyay | G06F 11/0757 |
| 2022/0107739 | A1 * | 4/2022 | McCarthy | G06F 3/0683 |
| 2024/0168822 | A1 * | 5/2024 | Preston | G06F 9/5022 |

\* cited by examiner

*Primary Examiner* — Robert W Beausoliel, Jr.
*Assistant Examiner* — Cheryl M Shechtman
(74) *Attorney, Agent, or Firm* — DALY, CROWLEY, MOFFORD & DURKEE, LLP

(57) ABSTRACT

An example methodology includes, by a computing device, determining a recurring time period during which performance data breaches a performance data threshold and applying a data exclusion window on the recurring time period, wherein performance data within the data exclusion window are excluded from system performance calculations. The method also includes, by the computing device, retrieving historical performance data associated with the data exclusion window and determining a percentage of the historical performance data that breach the performance data threshold. The method further includes, responsive to a determination that the percentage of the historical performance data that breach the performance data threshold is within an acceptable breach threshold, removing, by the computing device, the data exclusion window on the recurring time period.

20 Claims, 7 Drawing Sheets

| Week ID | Bucket ID | | | | | | | | | | ... | 30 | 31 | 32 | 33 | 34 | 35 | 36 | 37 | 38 | 39 | 40 | 41 |
|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | | | | | | | | | | | | |
| 2692 | 0.4 | 0.4 | 0.1 | 0.5 | 1.6 | 2.5 | 0.1 | 0.4 | 0.1 | 0.4 | | 0.4 | 0.3 | 0.3 | 0.4 | 0.4 | 0.3 | 0.4 | 0.1 | 0.3 | 0.5 | 0.5 | 0.3 |
| 2691 | 0.5 | 0.4 | 0.2 | 0.1 | 1.1 | 1.3 | 0.3 | 0.3 | 0.1 | 0.1 | | 0.4 | 0.3 | 0.5 | 0.3 | 0.3 | 0.1 | 0.3 | 0.3 | 0.2 | 0.1 | 0.2 | 0.5 |
| 2690 | 0.3 | 0.5 | 0.2 | 0.5 | 1.9 | 0.9 | 0.2 | 0.4 | 0.4 | 0.4 | | 0.3 | 0.5 | 2.8 | 0.2 | 0.1 | 0.4 | 0.5 | 0.3 | 0.2 | 0.4 | 0.1 | 0.5 |
| 2689 | 0.3 | 0.5 | 0.3 | 0.2 | 1.4 | 1.2 | 0.4 | 0.2 | 0.1 | 0.3 | | 0.1 | 0.4 | 0.2 | 0.4 | 0.5 | 0.5 | 0.3 | 0.4 | 0.3 | 0.5 | 0.2 | 0.4 |

FIG. 3A

| Week ID | Bucket ID | | | | | | | | | | | ... | 30 | 31 | 32 | 33 | 34 | 35 | 36 | 37 | 38 | 39 | 40 | 41 |
|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | | | | | | | | | | | | | |
| 2698 | 0.3 | 0.3 | 0.3 | 0.1 | 0.3 | 0.4 | 0.3 | 0.1 | 0.4 | 0.3 | | 0.1 | 0.4 | 0.4 | 0.4 | 0.5 | 0.1 | 0.2 | 0.2 | 0.5 | 0.1 | 0.5 | 0.3 |
| 2697 | 0.2 | 0.3 | 0.3 | 0.1 | 0.1 | 0.4 | 0.3 | 0.2 | 0.1 | 0.3 | | 0.4 | 0.2 | 0.3 | 0.2 | 0.5 | 0.5 | 0.3 | 0.3 | 0.5 | 0.1 | 0.1 | 0.5 |
| 2696 | 0.2 | 0.1 | 0.2 | 0.3 | 0.5 | 0.4 | 0.4 | 0.1 | 0.2 | 0.3 | | 0.1 | 0.3 | 0.3 | 0.5 | 0.1 | 0.4 | 1.9 | 0.4 | 0.2 | 0.3 | 0.2 | 0.2 |
| 2695 | 0.2 | 0.1 | 0.2 | 0.1 | 0.3 | 0.3 | 0.4 | 0.2 | 0.1 | 0.3 | | 0.5 | 0.4 | 0.2 | 0.2 | 0.5 | 0.2 | 0.5 | 0.4 | 0.3 | 0.3 | 0.1 | 0.4 |
| 2694 | 0.2 | 0.3 | 0.4 | 0.1 | 0.4 | 0.5 | 0.1 | 0.1 | 0.3 | 0.4 | | 0.2 | 0.2 | 0.4 | 0.3 | 0.5 | 0.2 | 0.4 | 0.4 | 0.4 | 0.2 | 0.5 | 0.1 |
| 2693 | 0.5 | 0.1 | 0.1 | 0.4 | 0.3 | 0.3 | 0.5 | 0.3 | 0.4 | 0.2 | | 0.1 | 0.4 | 0.2 | 0.1 | 0.4 | 0.3 | 0.3 | 0.1 | 0.4 | 0.5 | 0.1 | 0.4 |
| 2692 | 0.4 | 0.4 | 0.1 | 0.5 | 0.1 | 2.5 | 0.1 | 0.4 | 0.1 | 0.4 | | 0.4 | 0.3 | 0.3 | 0.4 | 0.4 | 0.3 | 0.4 | 0.1 | 0.3 | 0.5 | 0.5 | 0.3 |
| 2691 | 0.5 | 0.4 | 0.2 | 0.1 | 1.1 | 1.3 | 0.3 | 0.3 | 0.1 | 0.1 | | 0.4 | 0.3 | 0.5 | 0.3 | 0.3 | 0.1 | 0.3 | 0.3 | 0.2 | 0.1 | 0.2 | 0.5 |
| 2690 | 0.3 | 0.5 | 0.2 | 0.5 | 1.9 | 0.9 | 0.2 | 0.4 | 0.4 | 0.4 | | 0.3 | 0.5 | 2.8 | 0.2 | 0.1 | 0.4 | 0.5 | 0.3 | 0.2 | 0.4 | 0.1 | 0.5 |
| 2689 | 0.3 | 0.5 | 0.3 | 0.2 | 1.4 | 1.2 | 0.4 | 0.2 | 0.1 | 0.3 | | 0.1 | 0.4 | 0.2 | 0.4 | 0.5 | 0.5 | 0.3 | 0.4 | 0.3 | 0.5 | 0.2 | 0.4 |

FIG. 3B

DETECTION AND REMOVAL OF STALE DATA EXCLUSION WINDOWS

BACKGROUND

A storage system may include a plurality of storage arrays (e.g., storage devices) to provide data storage to a plurality of nodes. The plurality of storage arrays and the plurality of nodes may be situated in the same physical location, or in one or more physically remote locations. The plurality of nodes may be coupled to the storage devices by a high-speed interconnect, such as a switch fabric.

Storage system providers and other kinds of system providers may provide customers with system performance information, such as headroom, performance impact scores, and service level objective (SLO) compliance, among others, informing them of their utilization of the system. For instance, in the case of a storage system, headroom is that amount, typically in terabytes (TBs) and/or input/output operations per second (IOPS), of a typical workload that can be added to a storage array/storage resource pool (SRP)/ emulation combination without exceeding physical capacity and array component performance capacity limits. Performance impact scores are a representation of the changes to storage array utilizations when simulating the addition, modification, or removal of an application workload on a storage array. SLO compliance is a measure of a storage group's adherence to the response time expectation associated with an assigned service level. Such system performance information enables customers to better utilize the system.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method includes, by a computing device, determining a recurring time period during which performance data breaches a performance data threshold and applying a data exclusion window on the recurring time period, wherein performance data within the data exclusion window are excluded from system performance calculations. The method also includes, by the computing device, retrieving historical performance data associated with the data exclusion window and determining a percentage of the historical performance data that breach the performance data threshold. The method further includes, responsive to a determination that the percentage of the historical performance data that breach the performance data threshold is within an acceptable breach threshold, removing, by the computing device, the data exclusion window on the recurring time period.

In some embodiments, the method also includes, responsive to a determination that the percentage of the historical performance data that breach the performance data threshold is not within the acceptable breach threshold, maintaining, by the computing device, the data exclusion window.

In some embodiments, the acceptable breach threshold is 0 percent.

In some embodiments, the acceptable breach threshold is more than 0 percent.

In some embodiments, the system includes a storage system.

In some embodiments, the historical performance data is associated with continuous recurring time periods.

In some embodiments, the system performance calculations include a headroom calculation.

In some embodiments, the system performance calculations include a performance impact score calculation.

In some embodiments, the system performance calculations include a service level objective (SLO) compliance calculation.

In some embodiments, the method also includes sending, by the computing device, a notification informing of the removal of the data exclusion window on the performance data to another computing device associated with a customer of the system.

According to another illustrative embodiment provided to illustrate the broader concepts described herein, a computing device includes one or more non-transitory machine-readable mediums configured to store instructions and one or more processors configured to execute the instructions stored on the one or more non-transitory machine-readable mediums. Execution of the instructions causes the one or more processors to carry out a process including determining a recurring time period during which performance data breaches a performance data threshold and applying a data exclusion window on the recurring time period, wherein performance data within the data exclusion window are excluded from system performance calculations. The process also includes retrieving historical performance data associated with the data exclusion window and determining a percentage of the historical performance data that breach the performance data threshold. The process further includes, responsive to a determination that the percentage of the historical performance data that breach the performance data threshold is within an acceptable breach threshold, removing the data exclusion window on the recurring time period.

According to another illustrative embodiment provided to illustrate the broader concepts described herein, a non-transitory machine-readable medium encodes instructions that when executed by one or more processors cause a process to be carried out, the process including determining a recurring time period during which performance data breaches a performance data threshold and applying a data exclusion window on the recurring time period, wherein performance data within the data exclusion window are excluded from system performance calculations. The process also includes retrieving historical performance data associated with the data exclusion window and determining a percentage of the historical performance data that breach the performance data threshold. The process further includes, responsive to a determination that the percentage of the historical performance data that breach the performance data threshold is within an acceptable breach threshold, removing the data exclusion window on the recurring time period.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular descrip

FIGS. 3A and 3B are diagrams illustrating removal of a data exclusion window designation on a data bucket, in accordance with an embodiment of the present disclosure.

DETAILED DESCRIPTION

Figure 1:
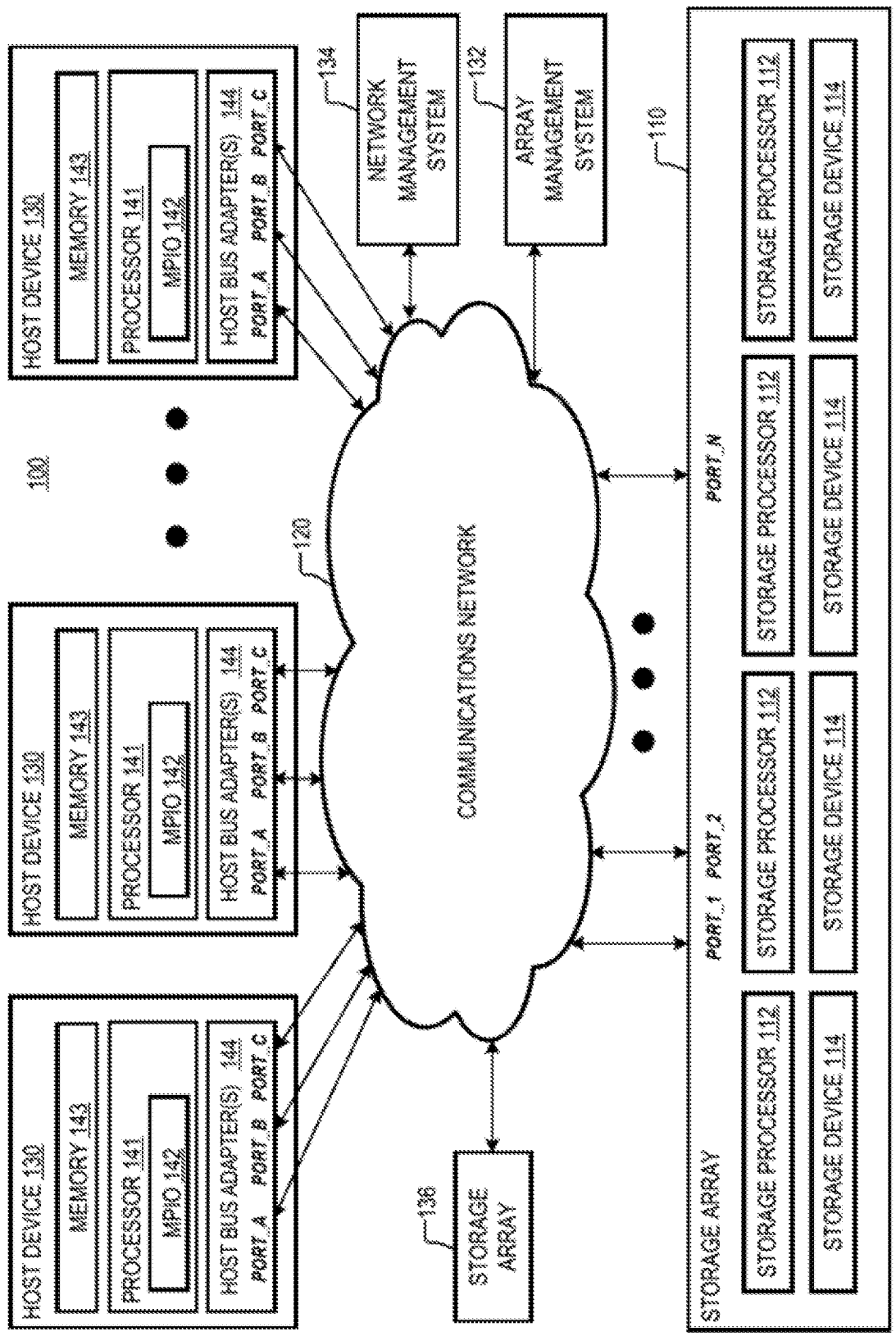
- FIG. 1 is a block diagram of an illustrative storage system within which embodiments of the present disclosure may be utilized.

Storage system providers, and system providers in general, may provide customers with system performance information to enable the customers to better utilize the system. However, the system performance calculations, such as the headroom calculation, performance impact score calculation, and SLO compliance calculation, are sensitive to peaks in performance data used in the calculations. For instance, many customers may have regular/recurring time periods during which a storage array may be "maxed out" intentionally to perform maintenance/backups outside of "normal" working hours, which results in peaks in the performance data. In these instances, the peaky data is masked off, and the system performance calculations are performed using only the normal performance data (i.e., the calculations do not use the peaky data that is masked off).

Note that the system performance calculations, e.g., headroom, performance impact score, and SLO compliance calculations, are based on a reduced performance data set since the peaky data is masked off and not used. However, the best and most accurate system performance information results when the most complete performance data set is analyzed and used in the calculations. Masking off or excluding data (e.g., performance data) may be beneficial for customers that have regular, explainable, acceptable peaks, but not all peaky data should be excluded. For example, a peak in the data may be due to a data anomaly which should be investigated. One problem is that performance data that has been excluded for a given time period is excluded from the system performance calculations until the data exclusion is manually removed. It is typically left to the customer to remove the data exclusion. This can lead to "good data" being excluded from the calculations or worse, and unexpected breach (e.g., a peak in the data) going undetected because it occurred during the time period of the data exclusion. In any case, failure to remove the data exclusion can lead to making of relevant breaches, which in turn can lead to the system performance calculations not truly reflecting the performance, health, etc., of the system.

Disclosed herein are concepts, structures, and techniques for automated detection and removal of stale data exclusion windows. Some embodiments proactively detect the resumption of expected behavior in the system performance data in a recurring time period on which a data exclusion window is applied and automatically remove the applied data exclusion window. Removing stale or unnecessary data exclusion windows expands the performance data set available for the system performance calculations, e.g., headroom, performance impact score, and SLO compliance calculations, thus producing a more precise measure of system performance. This in turn can allow for better utilization of the system as well as improved system performance due to early detection and analysis of data anomalies, for example. Numerous configurations and variations will be apparent in light of this disclosure.

FIG. 1 is a diagram of an example of a storage system 100 within which embodiments of the present disclosure may be utilized. As illustrated, system 100 may include a storage array 110, a communications network 120, a plurality of host devices 130, an array management system 132, a network management system 134, and a storage array 136.

Storage array 110 may include a plurality of storage processors 112 and a plurality of storage devices 114. Each of the storage processors 112 may include a computing device that is configured to receive I/O requests from any of the host devices 130 and execute the received I/O requests by reading or writing data to storage devices 114. In some implementations, each of the storage processors 112 may have an architecture that is the same or similar to the architecture of a computing device 600 of FIG. 6. Storage processors 112 may be located in the same geographic location or in different geographic locations. Similarly, storage devices 114 may be located in the same geographic location or different geographic locations. Each of the storage devices 114 may include any of a solid-state drive (SSD), a non-volatile random-access memory (nvRAM) device, a non-volatile memory express (NVME) device, a hard disk (HD), and/or any other suitable type of storage device. In some implementations, storage devices 114 may be arranged in one or more Redundant Array(s) of Independent Disks (RAID) arrays. Communications network 120 may include one or more of the Internet, a local area network (LAN), a wide area network (WAN), a fibre channel (FC) network, and/or any other suitable type of network.

Each of the host devices 130 may include a laptop, a desktop computer, a smartphone, a tablet, an Internet-of-Things device, and/or any other suitable type of electronic device that is configured to retrieve and store data in storage arrays 110 and 136. Each host device 130 may include a memory 143, a processor 141, and one or more host bus adapters (HBAs) 144. Memory 143 may include any suitable type of volatile and/or non-volatile memory, such as a solid-state drive (SSD), a hard disk (HD), a random-access memory (RAM), a Synchronous Dynamic Random-Access Memory (SDRAM), etc. Processor 141 may include any suitable type of processing circuitry, such as a general-purpose process (e.g., an x86 processor, a MIPS processor, an ARM processor, etc.), a special-purpose processor, an application-specific integrated circuit (ASIC), a field programmable gate array (FPGA), etc. Each of the HBAs 144 may be a circuit board or integrated circuit adapter that connects a respective one of the host devices 130 to storage array 110 (and/or storage array 136). In other words, each of the HBAs 144 may include a communications interface for connecting to communications network 120, storage array 110, and/or storage array 136. Although in the example of FIG. 1 each of the host devices 130 is provided with at least one HBA 144, alternative implementations are possible in which each of the host devices is provided with another type of communications interface, in addition to (or instead of) an HBA. The other type of communications interface may include one or more of an Ethernet adapter, a WiFi adapter, a local area network (LAN) adapter, etc.

Each processor 141 may be configured to execute a multi-path I/O (MPIO) driver 142. MPIO driver 142 may comprise, for example, PowerPath™ drivers from Dell EMC™, and/or other types of MPIO drivers that are arranged to discover available communications paths with any of the host devices 130 and the storage array 110. MPIO driver 142 may be configured to select I/O operations from any of the I/O queues of host devices 130. The sources of the I/O operations stored in the I/O queues may include respective processes of one or more applications executing on host devices 130.

HBA 144 of each of the host devices 130 may include one or more ports. Specifically, in the example of FIG. 1, HBA 144 of each of the host devices 130 includes three ports, which are herein enumerated as "port A", "port B", and "port C". Furthermore, storage array 110 may also include a plurality of ports. In the example of FIG. 1, the ports in storage array 110 are enumerated as "port 1", "port 2," and "port N", where N is a positive integer greater than 2. Each of the ports in host devices 130 may be coupled to one of the ports of the storage array via a corresponding network path. The corresponding network path may include one or more hops in communications network 120. Under the nomenclature of the present disclosure, a network path spanning between an HBA port of one of host devices 130 and one of the ports of the storage array 110 is referred to as a "network path of that host device 130".

Figure 6:
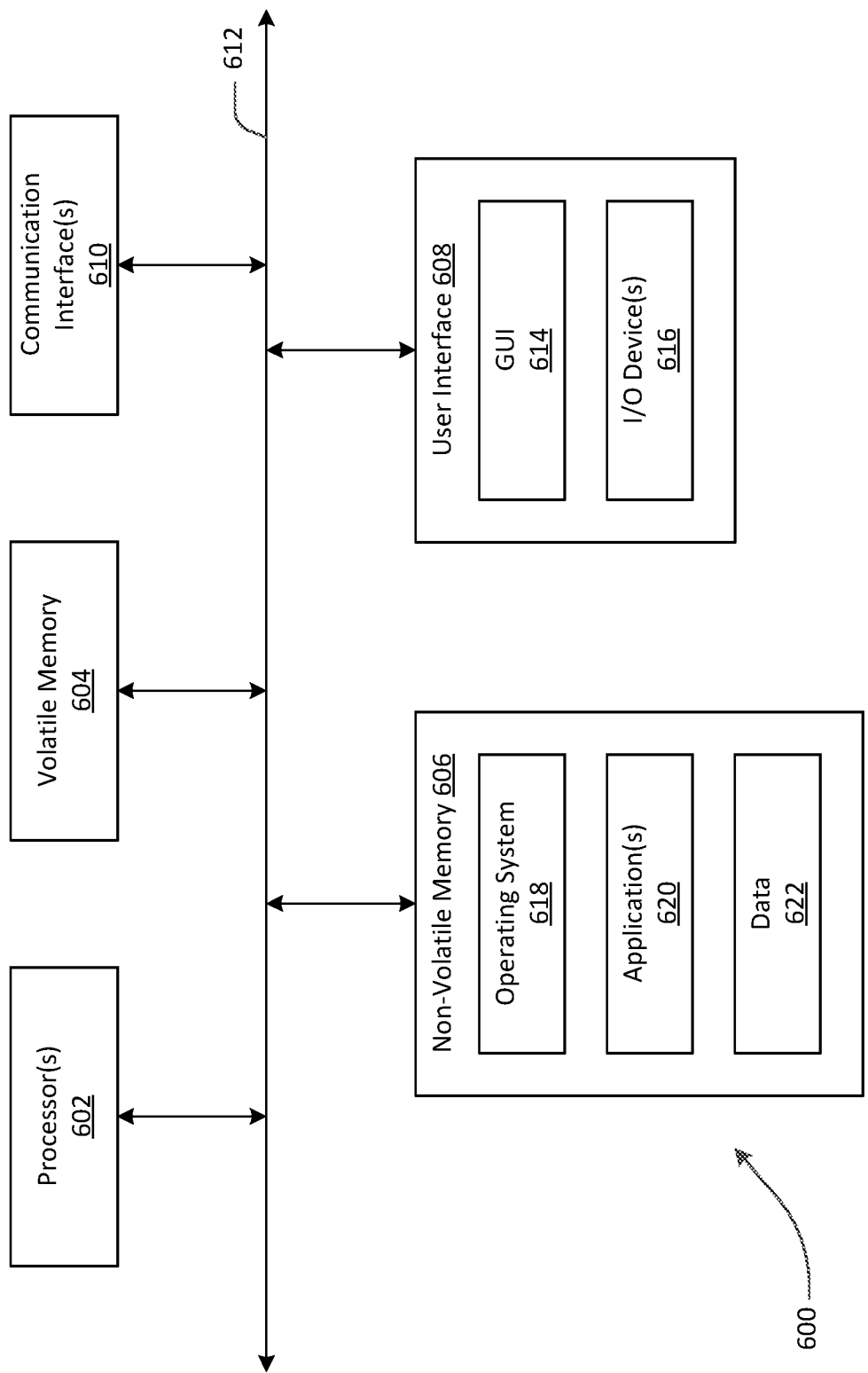
FIG. 6 is a block diagram illustrating selective components of an example computing device in which various aspects of the disclosure may be implemented, in accordance with an embodiment of the present disclosure.

Array management system 132 may include a computing device, such as computing device 600 of FIG. 6. Array management system 132 may be used by a system administrator to re-configure storage array 110, e.g., when degraded performance of storage array 110 is detected.

Network management system 134 may include a computing device, such as computing device 600 of FIG. 6. Network management system 134 may be used by a network administrator to configure communications network 120 when degraded performance of communications network 120 is detected.

Storage array 136 may be the same or similar to storage array 110. Storage array 136 may be configured to store the same data as storage array 110. Storage array 136 may be configured to operate in either active-active configuration with storage array 110 or in active-passive configuration. When storage arrays 110 and 136 operate in active-active configuration, a write request to either of storage arrays 110 and 136 is not acknowledged back to the sender until the data associated with the write request is written to both of the storage arrays 110 and 136. When storage arrays 110 and 136 are operated in active-passive configuration, a write request to a given one of the storage arrays 110 and 136 is acknowledge for as long the data associated with write request is written to the given one of the storage arrays 110 and 136 before the writing to the other one of the storage arrays is completed.

Figure 2:
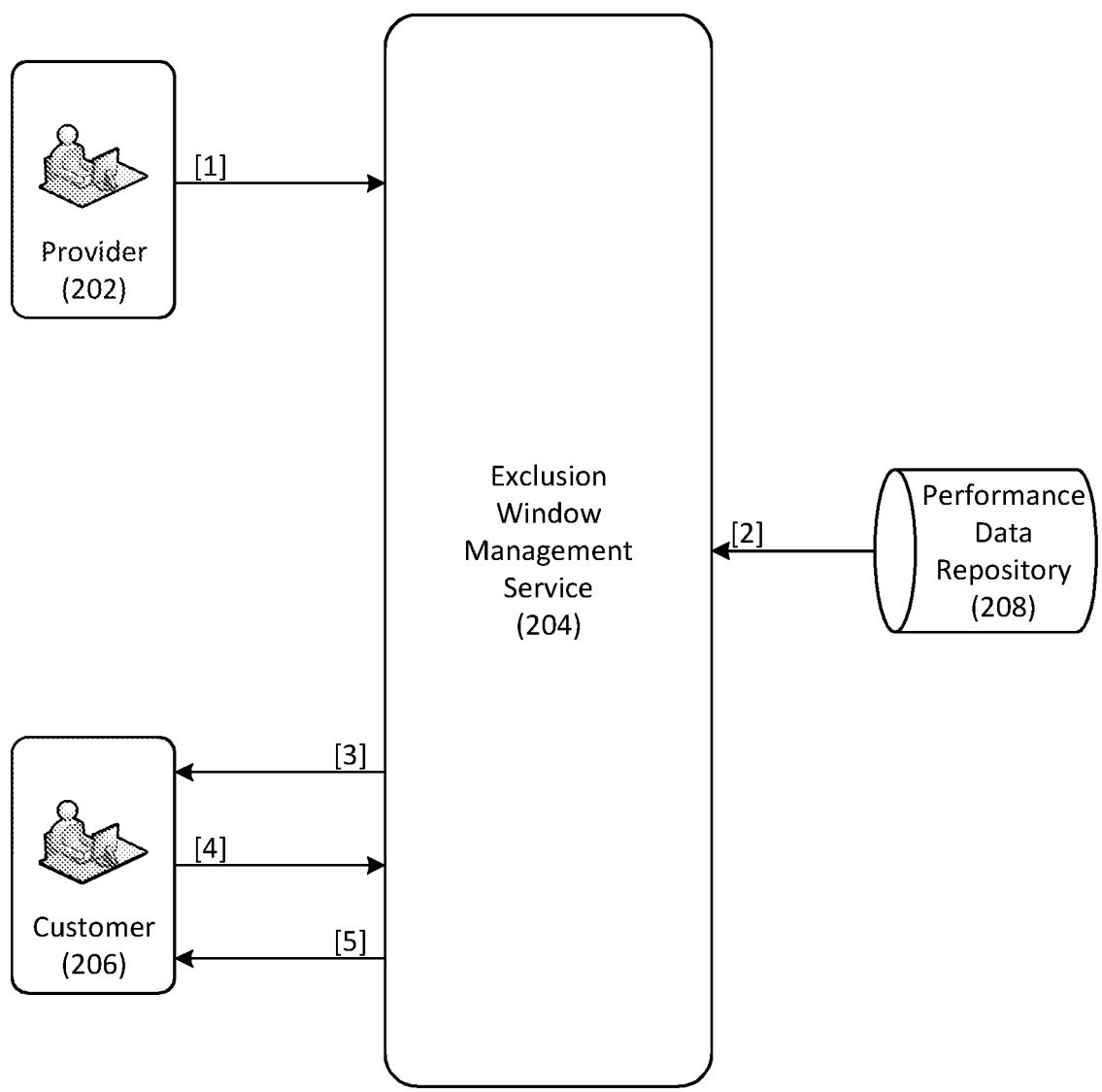
FIG. 2 is a schematic illustration of an example stale data exclusion window detection and removal topology that can be used to remove stale data exclusion windows, in accordance with an embodiment of the present disclosure.

FIG. 2 is a schematic illustration of an example stale data exclusion window detection and removal topology that can be used to remove stale data exclusion windows, in accordance with an embodiment of the present disclosure. Such a topology can be understood as a cyclical process in which a provider 202 within or associated with an organization leverages the services of an exclusion window management service 204. In the example of FIG. 2 and with reference to the diagrams illustrated in FIGS. 3A and 3B, provider 202 may be providing a storage system services (e.g., a storage solution) to a customer 206. Provider 202, as part of the services, may periodically generate system performance information which characterizes the performance of the system, such as performance characterizations of array components and storage group workloads. In particular, in certain embodiments, performance data relevant to generating system performance information, such as, for example, current load, incoming load, IOPS, response time (RT), and other key performance indicators (KPIs) may be collected from the underlying system and/or components of the system. For example, the performance data may be collected in five minute data samples or samples of other durations. For a particular performance metric, the collected data samples (e.g., the five minute performance data samples) may be condensed into four hour data buckets. In some embodiments, the data samples may be condensed using a weighted averaging technique that applies higher weights to peaks in the data. In any case, the collected data samples may be condensed so that each performance metric that is collected has 42 values (i.e., 42 four hour data buckets) over a course of a week. In some embodiments, the system may maintain the 42 values associated with each performance metric within a data structure 300, as shown in FIG. 3A.

As can be seen in FIG. 3A, data structure 300 may be in a tabular format in which the structured columns represent the different four hour data buckets, and each row represents the individual weeks. Each data bucket may be associated with an identifier (e.g., a Bucket ID). For example, Bucket ID=0 can represent hours one to four on Sunday, Bucket ID=1 can represent hours five to eight on Sunday, Bucket ID=2 can represent hours nine to 12 on Sunday, Bucket ID=3 can represent hours 13 to 16 on Sunday, Bucket ID=4 can represent hours 17 to 20 on Sunday, Bucket ID=5 can represent hours 21 to 24 on Sunday, Bucket ID=6 can represent hours one to four on Monday, and so on to where Bucket ID=41 can represent hours 21 to 24 on Saturday. Similarly, each week may be associated with an identifier (e.g., a Week ID). The Week ID may be, for example, a value representing a number of weeks since a Unix epoch or other reference point in time. As a result, each data bucket in data structure 300 represents a different four hour duration since the Unix epoch. For purposes of discussion, assume that data structure 300 contains RT data values for a storage group, the value contained in the cell identified by Bucket ID=0 and Week ID=2692 can represent the RT data for hours one to four on Sunday of week 2692 since the Unix epoch. In general, the values contained in the individual cells in data structure 300 can represent performance data for different four hour durations since the Unix epoch.

Referring again to the example of FIG. 2, provider 202 may utilize [1] exclusion window management service 204 to analyze the condensed data samples (i.e., the condensed performance data) on a continuous or periodic basis. For example, the condensed data samples may be analyzed upon a week's worth of data samples being condensed. For example, for a particular performance metric, exclusion window management service 204 can retrieve [2] the condensed performance data from a performance data repository 208 and analyze the performance data to determine whether the performance data breaches a predetermined threshold specified for the performance metric (e.g., a specified performance data threshold) on a recurring basis. Exclusion window management service 204 may perform the analysis upon one week of performance data being collected and condensed.

For example, as shown in FIG. 3A, exclusion window management service 204 can analyze the performance data upon the performance data for week 2692 being condensed. Continuing the RT example above and assuming that the specified performance data threshold for RT is 0.6 millisecond (ms), exclusion window management service 204 can analyze the performance data for weeks 2689 to 2692 and determine that data bucket 4 (i.e., data bucket identified by Bucket ID=4) is a recurring time period during which the performance data breaches the specified performance data threshold (i.e., data bucket 4 is a recurring time period during which RT data breaches the predetermined threshold of 0.6 ms specified for RT. Based on this determination, exclusion window management service 204 may identify data bucket 4 (i.e., the recurring time period represented by data bucket 4) as a candidate for a data exclusion window. (Indicated by reference numeral 302 in FIG. 3A.) Exclusion window management service 204 may also determine that data bucket 5 is a recurring time period during which the performance data breaches the specified performance data threshold. Based on this determination, exclusion window management service 204 may identify data bucket 5 (i.e., the recurring time period represented by data bucket 5) as a candidate for a data exclusion window. (Indicated by reference numeral 304 in FIG. 3A.) Exclusion window management service 204 may also determine a data anomaly during the time period represented by data bucket 32 and week 2690. (Indicated by reference numeral 306 in FIG. 3A.) Note that exclusion window management service 204 may have analyzed the performance data upon the performance data for each of the preceding weeks (e.g., week 269, week 2690, week 2689, etc.) being condensed.

Exclusion window management service 204 may then send [3] the results of the analysis to customer 206. For example, the results sent by exclusion window management service 204 may include a recommendation to apply a data exclusion window on data bucket 4, a recommendation to apply a data exclusion window on data bucket 5, and an indication of the data anomaly during the time period represented by data bucket 32 and week 2690. Customer 206 can review the results of the analysis provided by exclusion window management service 204 (e.g., review the analysis performed by exclusion window management service 204). Based on the review, customer 206 may determine that the recurring data breaches in data bucket 4 and data bucket 5 are likely due to maintenance being performed by customer 206. As such, customer 206 may determine that the performance data associated with bucket 4 and bucket 5 can be excluded from system performance calculations. In other words, customer 206 may decide that the performance data within data bucket 4 and data bucket 5 can be excluded from system performance calculations. Based on such determination, customer 206 may send [4] a notification to exclusion window management service 204 requesting that data exclusion windows be applied to data bucket 4 and data bucket 5, to cause the performance data associated with data buckets 4 and 5. Customer 206 can also investigate the reported data anomaly to determine whether the data anomaly is a breach (e.g., whether the data anomaly is caused by a breach in the system).

In response to the notification from customer 206, exclusion window management service 204 may apply a data exclusion window on data bucket 4 and a data exclusion window on data bucket 5. (Indicated by reference numerals 302 and 304, respectively, in FIG. 3A.) As a result of the applied data exclusion windows, the performance data from the recurring time periods corresponding to data bucket 4 and data bucket 5 are excluded from system performance calculations (i.e., performance data from data bucket 4 and data bucket 5 are not used in determining system performance).

Upon applying a data exclusion window, exclusion window management service 204 may check to determine whether the data exclusion window becomes "stale." For example, a data exclusion window may become stale (i.e., becomes a stale data exclusion window) when the performance data associated with the data exclusion window no longer breaches the predetermined threshold specified for the performance metric on a recurring basis. This may result from, for example, customer 206 ceasing the maintenance or other recurring event which maxed out the system (e.g., the storage array) during the time period corresponding to the data exclusion window. Continuing the RT example from above, as shown in FIG. 3B, exclusion window management service 204 may analyze the historical performance data from weeks 2693-2698 and determine that the historical performance data did not breach the specified performance data threshold during the time periods excluded by the applied data exclusion windows (e.g., the historical RT data during the time periods excluded by the applied data exclusion windows did not breach the predetermined threshold of 0.6 ms specified for RT). In other words, the performance data threshold breach stopped occurring from week 2693. As mentioned previously, this may be due to customer 206 no longer performing the recurring event that caused the performance data threshold breach and the resulting data exclusion windows being applied on data buckets 4 and 5. In response, exclusion window management service 204 may remove the stale data exclusion windows on the recurring time periods corresponding to data bucket 4 and data bucket 5. That is, exclusion window management service 204 may remove the data exclusion window designation on the recurring time periods corresponding to data bucket 4 and data bucket 5. As a result, the performance data from the recurring time periods corresponding to data bucket 4 and data bucket 5 from week 2693 are included in system performance calculations (i.e., performance data from data bucket 4 and data bucket 5 from week 2693 are used in determining system performance).

Note that the data exclusion window on data bucket 4 and the data exclusion window on data bucket 5 operate independent of each other. For instance, it may be the case that only the data exclusion window applied on data bucket 4 becomes stale and removed while the data exclusion window applied on data bucket 5 does not become stale and is maintained, and vice versa.

Upon removing a stale data exclusion window on a data bucket, exclusion window management service 204 may send [5] a notification to customer 206 informing of the stale data exclusion window. For example, upon removing the stale data exclusion windows on data buckets 4 and 5 from week 2693, exclusion window management service 204 can send a notification to customer 206 informing of the removal of the data exclusion window on data buckets 4 and 5 starting from week 2693. In some embodiments, exclusion window management service 204 may send a notification to customer 206 informing of a detection of a stale data exclusion window and remove the stale data exclusion window upon receiving confirmation (e.g., an instruction) from customer 206 authorizing the removal of the stale data exclusion window.

Exclusion window management service 204 may also determine a data anomaly during the time period represented by data bucket 36 and week 2696 when analyzing the performance data. (Indicated by reference numeral 308 in FIG. 3B.) However, since performance data breach is not on a recurring basis, exclusion window management service 204 may report the performance data threshold breach as a data anomaly to customer 206.

Figure 4:
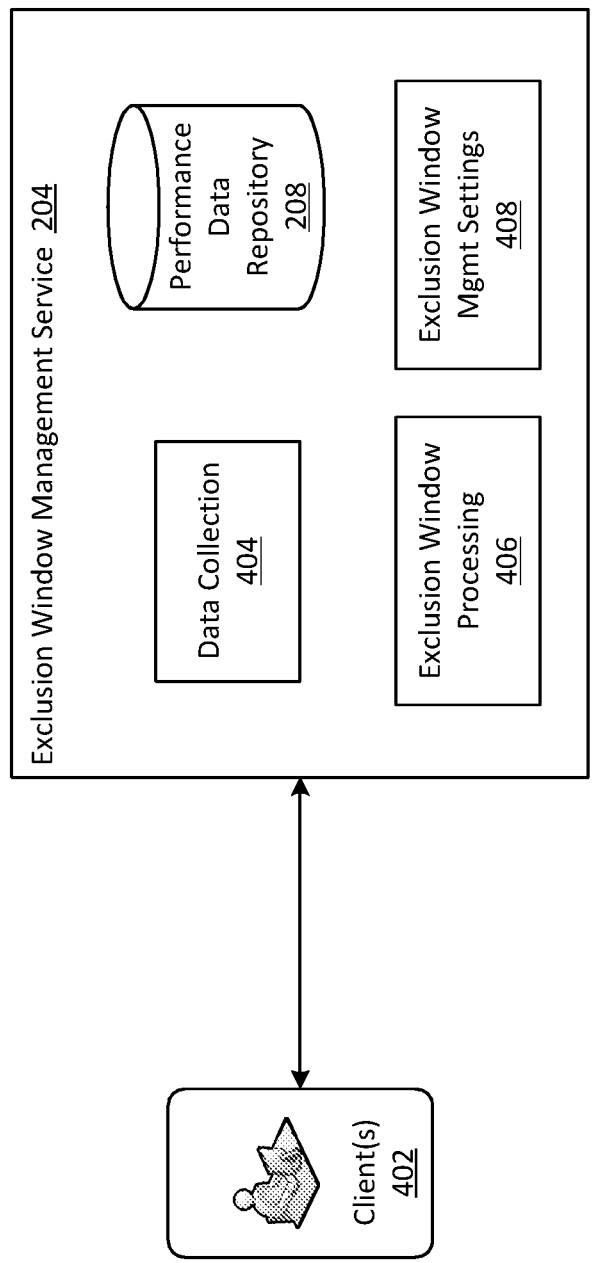
FIG. 4 is a block diagram of an illustrative system for stale data exclusion window detection and removal, in accordance with an embodiment of the present disclosure.

Referring now to FIG. 4, shown is a block diagram of an illustrative system 400 for stale data exclusion window detection and removal, in accordance with an embodiment of the present disclosure. In FIG. 4, elements of FIG. 2 are shown using like reference designators and, unless context dictates otherwise, may not be described again for purposes of clarity. Illustrative system 300 includes one or more clients 502 configured to communicate with exclusion window management service 204 via one or more communication networks (not shown). The communication networks can include, for example, the Internet, LANs, WANs, FC networks, etc.

Clients 402 may include any type of client devices configured to install and/or run applications (or "apps"). For example, a representative client 402 may run a client application, such as a web client or a dedicated application, that a user (e.g., a customer) can use to access and interact with exclusion window management service 204. For example, as described previously, a customer (e.g., customer 206 of FIG. 2) may use their client 402 to receive analysis results and notifications from and/or otherwise interact with exclusion window management service 204.

Exclusion window management service 204 may be hosted on a physical and/or virtual machine or processing device. For example, relating FIG. 4 to FIG. 1, exclusion window management service 204 may be hosted on array management system 132, network management system 13, or any one of host devices 130. In other embodiments, exclusion window management service 204 may be hosted on a physical and/or virtual machine or processing device that is separate from but is communicably coupled to storage system 100 of FIG. 1. In general, exclusion window management service 204 may be hosted on a physical and/or virtual machine or processing device capable of providing communication (e.g., secure communication) and access to the performance data that is to be analyzed/processed by exclusion window management service 204.

In the example of FIG. 4, exclusion window management service 204 includes a data collection module 404, performance data repository 208, an exclusion window processing module 406, and an exclusion window management settings 408. Exclusion window management service 204 can include other hardware and software resources such as those described herein with respect to computing device 600 of FIG. 6.

Data collection module 404 is operable to collect or otherwise retrieve the performance data that is to be analyzed/processed by exclusion window processing module 406 on a continuous or periodic basis (e.g., according to a predetermined schedule specified by the organization). For example, data collection module 404 may retrieve the performance data from one or more data sources, such as the system (e.g., storage system 100 of FIG. 1) and/or components of the system whose performance data is to be analyzed/processed by exclusion window processing module 406. Data collection module 404 may utilize application programming interfaces (APIs) provided by the various data sources to collect/retrieve the items therefrom. In some embodiments, for a particular performance metric, data collection module 404 may condense the retrieved performance data into four hour data buckets over a course of a week, as previously described with reference to FIG. 2.

In some embodiments, data collection module 404 can save (e.g., record) the retrieved performance data and/or the condensed performance data within performance data repository 208, where it can subsequently be retrieved and used. For example, the performance data can be retrieved from performance data repository 208 and analyzed/processed by exclusion window processing module 406. In some embodiments, performance data repository 208 may correspond to a storage service within the computing environment of exclusion window management service 204.

Exclusion window processing module 406 is operable to analyze/process the performance data and identify peaks in the performance data, meaning that performance data breaches a predetermined threshold specified for the performance metric (e.g., a specified performance data threshold) during a time period. In some embodiments, exclusion window processing module 406 can determine whether the peak in the performance data is a recurring peak. That is, exclusion window processing module 406 can determine whether the performance data breaches a specified performance data threshold on a recurring basis. If the performance data breaches a specified performance data threshold on a recurring basis, exclusion window processing module 406 can identify the recurring time period during which the performance data breaches the specified performance data threshold as a candidate for applying a data exclusion window. In some embodiments, exclusion window processing module 406 can send a notification to client 402 (e.g., a client 402 associated with the customer of the service) informing of the recurring peaks in the performance data and recommending that a data exclusion window be applied (e.g., recommending that a data exclusion window be applied on the recurring time period during which the performance data breaches the specified performance data threshold). Exclusion window processing module 406 can then apply a data exclusion window on the recurring time period during which the performance data breaches the specified performance data threshold based on the response from the customer.

Exclusion window processing module 406 can also check for stale data exclusion windows and remove the stale data exclusion windows. More particularly, according to one embodiment, for a particular data exclusion window, exclusion window processing module 406 can evaluate the historical performance data associated with the data exclusion window for a past duration, such as 2 weeks, 3 weeks, 5 weeks, etc., and determine the number of performance data breaches (e.g., determine the number of times the performance data breaches the specified performance data threshold) during that past duration. Exclusion window processing module 406 can then remove or maintain the data exclusion window (e.g., determine whether the data exclusion window is a stale data exclusion window) based on the number of performance data breaches during the past duration.

For example, in one embodiment, the number of performance data breaches for a performance metric may be computed as follows:

$$\text{recent\_breaches} = \sum_{i=n-m}^{n} f(x)_i,$$

where:
recent_breaches=number of performance data breaches $$f(x) = \begin{cases} 0, & x < P \\ 1, & \text{otherwise} \end{cases}$$

n=weeks since Unix epoch
m=number of weeks of historical performance data to consider
x=data value for a given week ID and bucket ID
P=performance data threshold.

Based on the computation above, exclusion window processing module 406 can determine a data exclusion window to be a stale data exclusion window if there are no performance data breaches during the time period corresponding to the data exclusion window for the past m weeks. If a data exclusion window on a recurring time period (e.g., a recurring data bucket) is determined to be a stale data exclusion window, exclusion window processing module 406 can remove the data exclusion window on the recurring time period.

In some embodiments, exclusion window processing module 406 can determine a data exclusion window to be a stale data exclusion window even if there are performance data breaches. In other words, exclusion window processing module 406 may allow for a number of performance data breaches in the analyzed historical performance data and still determine that the data exclusion window is a stale data exclusion window. In particular, according to one embodiment, exclusion window processing module 406 can apply a sensitivity factor s (e.g., s=0.1, 0.2, 0.3, etc.) to the number of performance data breaches, recent_breaches, during the time period corresponding to the data exclusion window for the past m weeks, as follows:

$$\text{recent\_breaches} = \sum\nolimits_{i=n-m}^{n} f(x)_i \le (m * s)$$

Based on the applied sensitivity factor s, exclusion window processing module 406 can allow for a number of performance data breaches and still determine a data exclusion window to be a stale data exclusion window. For example, if s is specified to be 0.1 (i.e., s=0.1), exclusion window processing module 406 can determine a data exclusion window to be a stale data exclusion window if there are less than 10% performance data breaches during the time period corresponding to the data exclusion window for the past m weeks. Note that applying the sensitivity factor may be beneficial in cases where large amounts of historical performance data (e.g., large m) is analyzed to determine stale date exclusion windows.

In some embodiments, exclusion window processing module 406 can notify the customer of a removal of a stale data exclusion window. For example, exclusion window processing module 406 can send notification to client 402 (e.g., a client 402 associated with the customer) informing of the removal of a stale data exclusion window.

In some embodiments, exclusion window processing module 406 can notify the customer of a detected sale data exclusion window. For example, exclusion window processing module 406 can send a notification to client 402 (e.g., a client 402 associated with the customer) informing of the detected stale data exclusion window. In some such embodiments, exclusion window processing module 406 can remove the stale data exclusion window upon receiving confirmation from the customer authorizing the removal of the stale data exclusion window.

Exclusion window management settings 408 contain the exclusion window management service preferences, such as the performance data thresholds specified for the various performance metrics, the acceptable breach thresholds, the duration of the data buckets, the schedule for analyzing the performance data, and other settings and parameter values. The acceptable breach thresholds (i.e., sensitivity factor s) may vary depending on factors such as the performance metric, the recurring time period corresponding to the data exclusion window, and the customer. The exclusion window management service preferences may be configurable by the organization. In some embodiments, exclusion window management settings 408 may be maintained within a data store.

Figure 5:
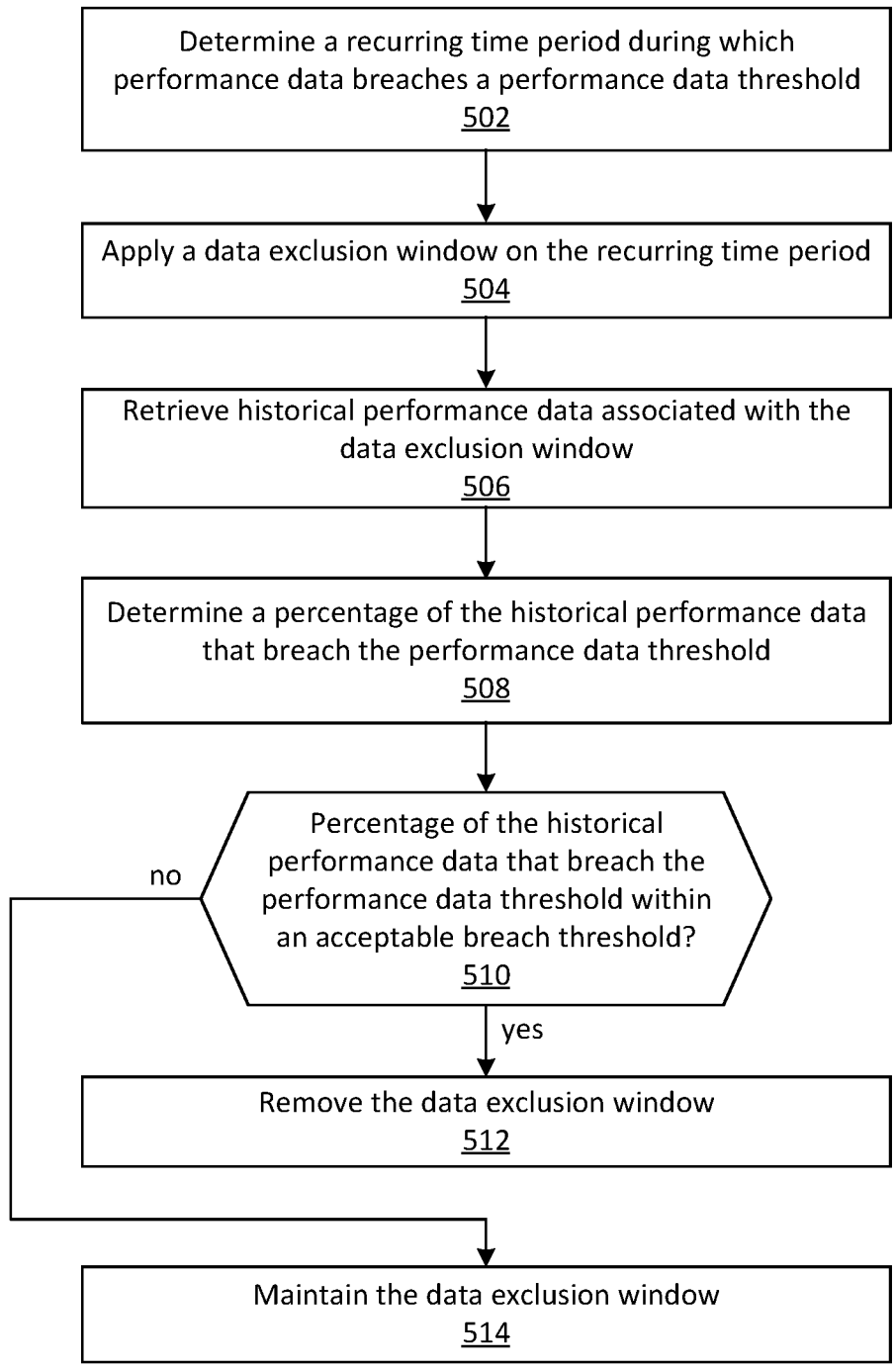
FIG. 5 is a flow diagram of an example process for stale data exclusion window detection and removal, in accordance with an embodiment of the present disclosure.

FIG. 5 is a flow diagram of an example process 500 for stale data exclusion window detection and removal, in accordance with an embodiment of the present disclosure. Illustrative process 500 may be implemented, for example, within system 400 of FIG. 4. In more detail, process 500 may be performed, for example, in whole or in part by data collection module 404 and exclusion window processing module 406, or any combination of these and other components of system 400 described with respect to FIG. 4.

With reference to process 500 of FIG. 5, at 502, a recurring time period during which performance data breaches a performance data threshold may be determined. For example, for a particular performance metric, the performance data can be analyzed to determine whether the performance data breaches the performance data threshold specified for the performance metric on a recurring basis. The determination of what is a recurring basis (e.g., the number of performance data breaches for the performance data breach to be recurring) may be configurable by the organization. For example, if the number of performance data breaches exceeds N (e.g., N=3, 4, 5, etc.), the performance data breach can be determined to be occurring on a recurring basis. In some embodiments, the value of N may vary based on the performance metric.

At 504, a data exclusion window may be applied on the recurring time period. For example, a recommendation regarding the application of the data exclusion window may be sent to a customer of the service (e.g., customer 206 of FIG. 2) and applied on the recurring time period upon receipt of a request (e.g., an authorization) from the customer.

At 506, historical performance data associated with the data exclusion window may be retrieved. For example, the historical performance data may be for a particular performance metric. The historical performance data may be retrieved from a data repository (e.g., performance data repository 208 of FIG. 4).

At 508, a percentage of the historical performance data that breach the performance data threshold may be determined. For example, the historical performance data associated with the data exclusion window for a past duration (e.g., for the past 2 weeks, 3 weeks, 5 weeks, etc.) may be analyzed to determine the percentage of the historical performance data that breach the performance data threshold specified for the performance metric. The determination at 508 is whether the time period associated with the data exclusion window is still a recurring time period during which performance data breaches the performance data threshold. In other words, whether the data exclusion window is a stale data exclusion window.

At 510, a check may be performed to determine whether the percentage of the historical performance data that breach the performance data threshold as determined at 508 is within an acceptable breach threshold. The acceptable breach threshold operates as a sensitivity factor that allows for a percentage of performance data breaches for a data exclusion window. For example, if the acceptable breach threshold is P (e.g., P=0.0, 0.1, 0.2, etc.), P % performance data breaches are permitted for a data exclusion window before the data exclusion window becomes stale. In some embodiments, the value of P may vary based on the performance metric.

If, at 510, it is determined that the percentage of the historical performance data that breach the performance data threshold is within the acceptable breach threshold, then, at 512, the data exclusion window on the recurring time period may be removed. For example, the data exclusion window on the recurring time period may be removed since the determination at 510 is that the data exclusion window on the recurring time period is a stale data exclusion window.

Otherwise, if, at 510, it is determined that the percentage of the historical performance data that breach the performance data threshold is not within the acceptable breach threshold, then, at 514, the data exclusion window on the recurring time period may be maintained. For example, the data exclusion window on the recurring time period may be maintained since the determination at 510 is that the data exclusion window on the recurring time period is not a stale data exclusion window.

FIG. 6 is a block diagram illustrating selective components of an example computing device 600 in which various aspects of the disclosure may be implemented, in accordance with an embodiment of the present disclosure. For example, illustrative computing device 600 can perform all or part of the processes described herein. As shown, computing device 600 includes one or more processors 602, a volatile memory 604 (e.g., random access memory (RAM)), a non-volatile memory 606, a user interface (UI) 608, one or more communications interfaces 610, and a communications bus 612.

Non-volatile memory 606 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 608 may include a graphical user interface (GUI) 614 (e.g., a touchscreen, a display, etc.) and one or more input/output (I/O) devices 616 (e.g., a mouse, a keyboard, a microphone, one or more speakers, one or more cameras, one or more biometric scanners, one or more environmental sensors, and one or more accelerometers, etc.).

Non-volatile memory 606 stores an operating system 618, one or more applications 620, and data 622 such that, for example, computer instructions of operating system 618 and/or applications 620 are executed by processor(s) 602 out of volatile memory 604. In one example, computer instructions of operating system 618 and/or applications 620 are executed by processor(s) 602 out of volatile memory 604 to perform all or part of the processes described herein (e.g., processes illustrated and described with reference to FIGS. 1 through 5). In some embodiments, volatile memory 604 may include one or more types of RAM and/or a cache memory that may offer a faster response time than a main memory. Data may be entered using an input device of GUI 614 or received from I/O device(s) 616. Various elements of computing device 600 may communicate via communications bus 612.

The illustrated computing device 600 is shown merely as an illustrative client device or server and may be implemented by any computing or processing environment with any type of machine or set of machines that may have suitable hardware and/or software capable of operating as described herein.

Processor(s) 602 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 602 may be analog, digital, or mixed signal. In some embodiments, processor 602 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 610 may include one or more interfaces to enable computing device 600 to access a computer network such as a Local Area Network (LAN), a Wide Area Network (WAN), a Personal Area Network (PAN), or the Internet through a variety of wired and/or wireless connections, including cellular connections.

In described embodiments, computing device 600 may execute an application on behalf of a user of a client device. For example, computing device 600 may execute one or more virtual machines managed by a hypervisor. Each virtual machine may provide an execution session within which applications execute on behalf of a user or a client device, such as a hosted desktop session. Computing device 600 may also execute a terminal services session to provide a hosted desktop environment. Computing device 600 may provide access to a remote computing environment including one or more applications, one or more desktop applications, and one or more desktop sessions in which one or more applications may execute.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:
    collecting, by a computing device, a first set of performance data relating to performance of a storage system over a first window of time;
    determining, by the computing device, a recurring time period during which performance data within the first set breaches a performance data threshold;
    applying, by the computing device, a data exclusion window on the recurring time period, the data exclusion window causing performance data relating to performance of the storage system within the recurring time period to be excluded from one or more first system performance calculations;
    retrieving, by the computing device, historical performance data related to performance of the storage system within the recurring time period over a second window of time while the data exclusion window is applied;
    determining, by the computing device, a percentage of the historical performance data that breach the performance data threshold; and
    responsive to a determination that the percentage of the historical performance data that breach the performance data threshold is within an acceptable breach threshold, removing, by the computing device, the data exclusion window on the recurring time period, causing performance data relating to performance of the storage system within the recurring time period for a window of time after the first window of time to be included in one or more second system performance calculations.

2. The method of claim 1, further comprising, responsive to a determination that the percentage of the historical performance data that breach the performance data threshold is not within the acceptable breach threshold, maintaining, by the computing device, the data exclusion window.

3. The method of claim 1, wherein the acceptable breach threshold is 0 percent.

4. The method of claim 1, wherein the computing device collects the first set of performance data using at least one application programming interface (API).

5. The method of claim 1, further comprising:
    responsive to the determination that the percentage of the historical performance data that breach the performance data threshold is within the acceptable breach threshold, sending a notification over a network to a client device notifying a customer that the data exclusion window may be stale; and responsive to receiving over the network an instruction from the client device to remove the data exclusion window on the recurring time period, removing, by the computing device, the data exclusion window on the recurring time period.

6. The method of claim 1, wherein at least one of the one or more first system performance calculations or the one or more second system performance calculations includes a headroom calculation.

7. The method of claim 1, wherein at least one of the one or more first system performance calculations or the one or more second system performance calculations includes a performance impact score calculation.

8. The method of claim 1, wherein at least one of the one or more first system performance calculations or the one or more second system performance calculations includes a service level objective (SLO) compliance calculation.

9. The method of claim 1, further comprising sending, by the computing device, a notification informing of the removal of the data exclusion window on the performance data to another computing device associated with a customer of the system.

10. A computing device comprising:
one or more non-transitory machine-readable mediums configured to store instructions; and
one or more processors configured to execute the instructions stored on the one or more non-transitory machine-readable mediums, wherein execution of the instructions causes the one or more processors to carry out a process comprising:
collecting a first set of performance data relating to performance of a storage system over a first window of time;
determining a recurring time period during which performance data within the first set breaches a performance data threshold;
applying a data exclusion window on the recurring time period, the data exclusion window causing performance data relating to performance of the storage system within the recurring time period to be excluded from one or more first system performance calculations;
retrieving historical performance data related to performance of the storage system within the recurring time period over a second window of time while the data exclusion window is applied;
determining a percentage of the historical performance data that breach the performance data threshold; and
responsive to a determination that the percentage of the historical performance data that breach the performance data threshold is within an acceptable breach threshold, removing the data exclusion window on the recurring time period, causing performance data relating to performance of the storage system within the recurring time period for a window of time after the first window of time to be included in one or more second system performance calculations.

11. The computing device of claim 10, wherein the process further comprises, responsive to a determination that the percentage of the historical performance data that breach the performance data threshold is not within the acceptable breach threshold, maintaining the data exclusion window.

12. The computing device of claim 10, wherein the acceptable breach threshold is 0 percent.

13. The computing device of claim 10, wherein the process further comprises:
receiving, over a network from a client device, one or more exclusion window management service preferences; and
storing, by the computing device, the one or more exclusion window management service preferences in a data store.

14. The computing device of claim 13, wherein the one or more exclusion window management service preferences relate to one or more of:
the performance data threshold;
the acceptable breach threshold;
a duration of time over which performance data is condensed into a bucket of data; or
a schedule for analyzing performance data.

15. The computing device of claim 10, wherein at least one of the one or more first system performance calculations or the one or more second system performance calculations includes one of a headroom calculation, a performance impact score calculation, or a service level objective (SLO) compliance calculation.

16. The computing device of claim 10, wherein the process further includes sending a notification informing of the removal of the data exclusion window on the performance data to another computing device associated with a customer of the system.

17. A non-transitory machine-readable medium encoding instructions that when executed by one or more processors cause a process to be carried out, the process including:
collecting a first set of performance data relating to performance of a storage system over a first window of time;
determining a recurring time period during which performance data within the first set breaches a performance data threshold;
applying a data exclusion window on the recurring time period, the data exclusion window causing performance data relating to performance of the storage system within the recurring time period to be excluded from one or more first system performance calculations;
retrieving historical performance data related to performance of the storage system within the recurring time period over a second window of time while the data exclusion window is applied;
determining a percentage of the historical performance data that breach the performance data threshold; and
responsive to a determination that the percentage of the historical performance data that breach the performance data threshold is within an acceptable breach threshold, removing the data exclusion window on the recurring time period, causing performance data relating to performance of the storage system within the recurring time period for a window of time after the first window of time to be included in one or more second system performance calculations.

18. The machine-readable medium of claim 17, wherein the process further comprises, responsive to a determination that the percentage of the historical performance data that breach the performance data threshold is not within the acceptable breach threshold, maintaining the data exclusion window.

19. The machine-readable medium of claim 17, wherein the acceptable breach threshold is 0 percent.

20. The machine-readable medium of claim 17, wherein the acceptable breach threshold is more than 0 percent.

* * * * *